United States Patent [19]

Matake et al.

[11] 4,074,947
[45] Feb. 21, 1978

[54] FITTINGS FOR CONNECTING COLUMNS AND BEAMS

[75] Inventors: Naomasa Matake; Tadayoshi Yoshimura, both of Kitakyushu; Kuniaki Sato, Hiratsuka, all of Japan

[73] Assignee: Hitachi Metals, Ltd., Tokyo, Japan

[21] Appl. No.: 602,099

[22] Filed: Aug. 5, 1975

[30] Foreign Application Priority Data

| Aug. 12, 1974 | Japan | 49-91572 |
| Aug. 12, 1974 | Japan | 49-91573 |
| Jan. 24, 1975 | Japan | 50-9707 |

[51] Int. Cl.² ............................................. F16B 7/18
[52] U.S. Cl. ..................................... 403/406; 403/189
[58] Field of Search ............... 52/758 R, 758 F, 721; 403/187, 189, 231, 406

[56] References Cited

U.S. PATENT DOCUMENTS

| 2,201,826 | 5/1940 | Ditchfield | 52/758 R X |
| 3,674,289 | 7/1972 | Geraci | 52/758 F |
| 3,938,297 | 2/1976 | Sato et al. | 403/189 X |
| 3,960,458 | 6/1976 | Sato et al. | 52/758 F X |

FOREIGN PATENT DOCUMENTS 654,930  1/1938  Germany ............... 403/187

OTHER PUBLICATIONS

Book: Design of Steel Structures by Gaylord and Gaylord, Drawing FIG. 9-6(e) cited, p. 386, Published in 1957 by McGraw–Hill Book Co.

Primary Examiner—Wayne L. Shedd
Attorney, Agent, or Firm—Oblon, Fisher, Spivak, McClelland & Maier

[57] ABSTRACT

Fittings for connecting H-shaped beams and columns of a steel frame construction, each fitting comprising an L-shaped outer fitting member connecting an outer surface of a flange of the beam to the column by means of bolts and an L-shaped inner fitting member connecting an inner surface of the flange of the beam to the column by means of bolts having a space for receiving therein a web of the beam, thereby embracing the flange of the beam between the L-shaped outer and inner fitting members to provide two surface frictional engagements. A column side plate of each the L-shaped fitting members successively increases its thickness from a free end to a portion connected to the beam side plate thereof. A method of connecting a column and a beam having an H-shaped section, wherein after the L-shaped outer fitting member for a lower flange of the beam has been connected to the column, the other outer and inner L-shaped fitting members are temporarily fixed to the beam such that the overall length of the thus assembled beam and fittings is shorter than their ultimate length. Then the beam and fittings are placed on the first outer fitting member and all the fitting members are ultimately bolted to the column and the beam.

9 Claims, 19 Drawing Figures

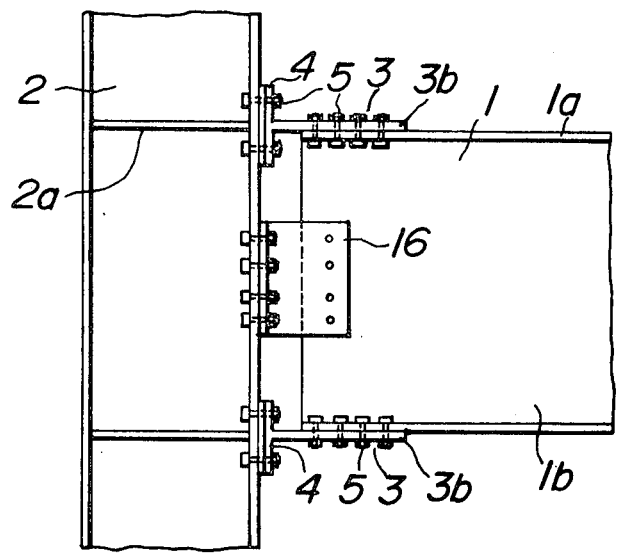
FIG._1 PRIOR ART
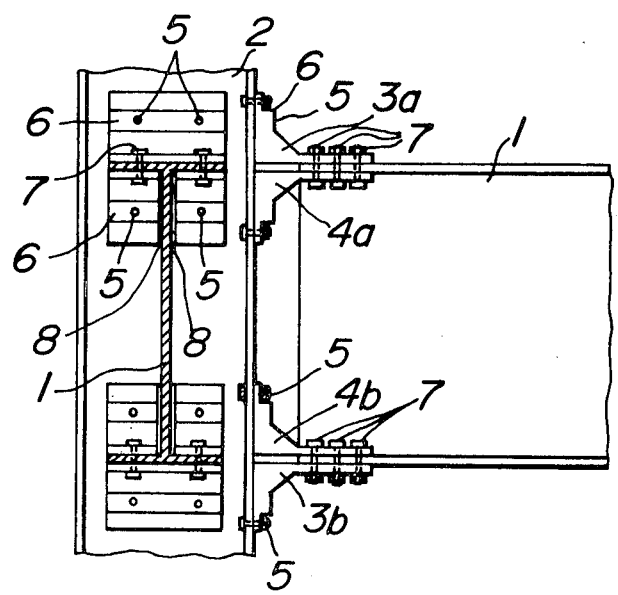
FIG._2

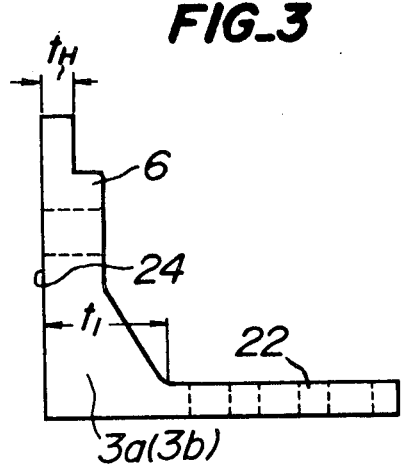
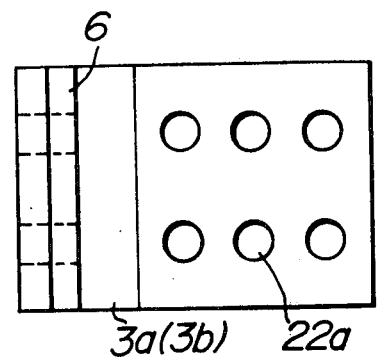
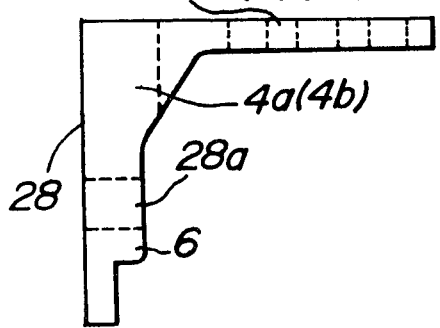
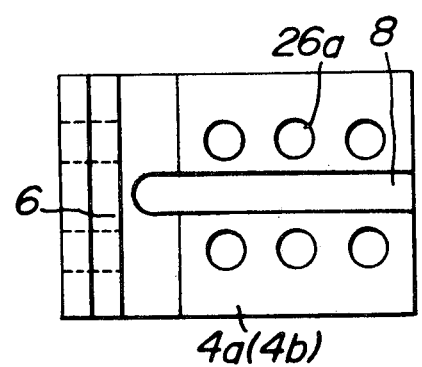

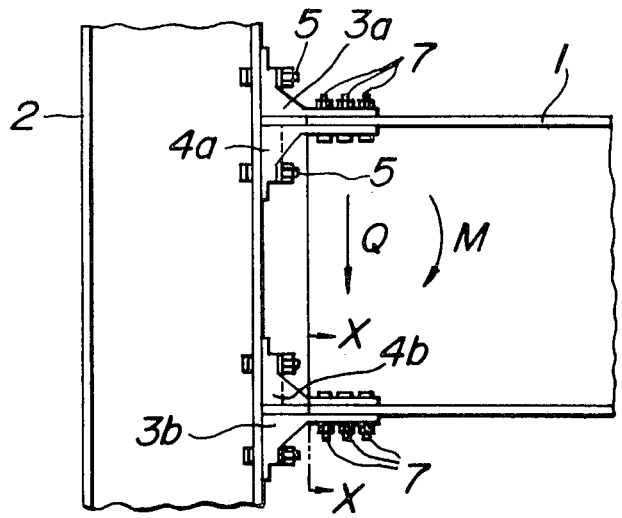
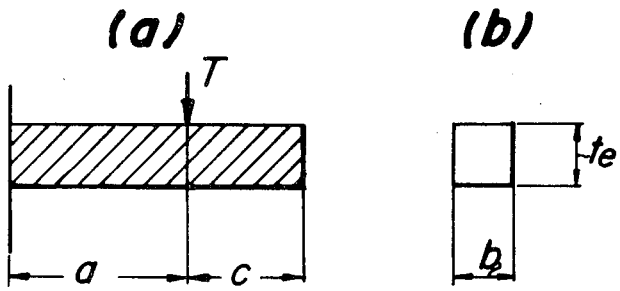
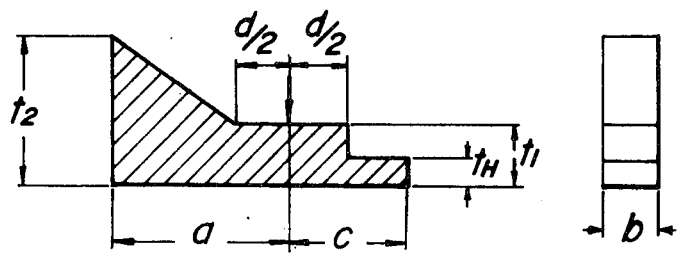

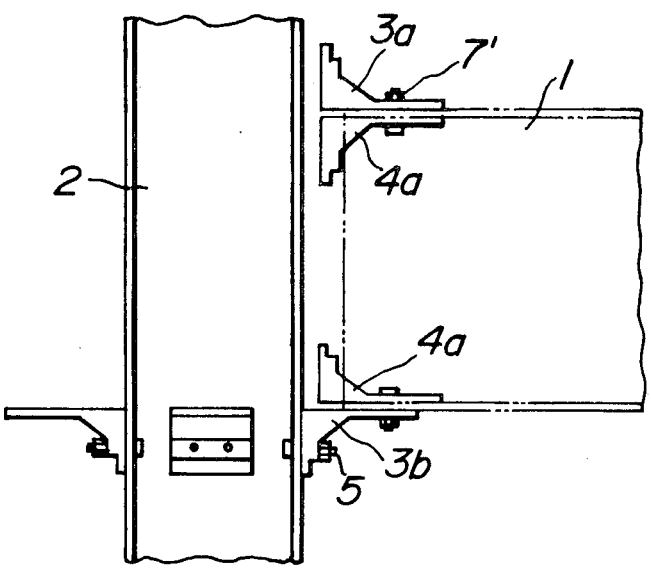
FIG._10
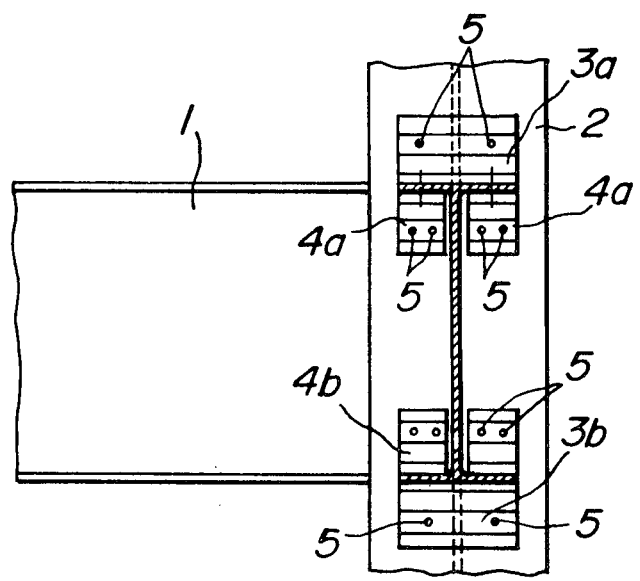
FIG._11

FIG._12
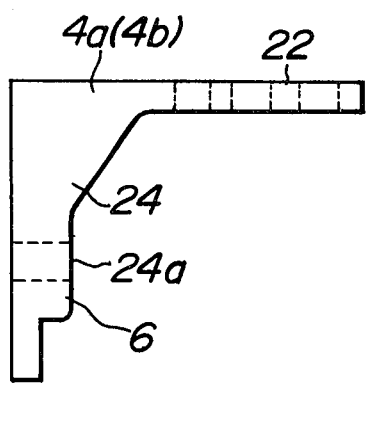
FIG._13
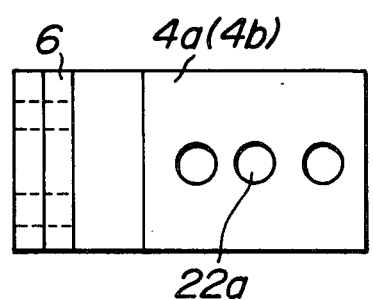
FIG._14
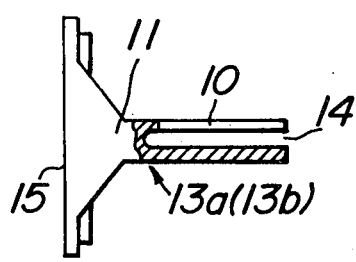
FIG._15
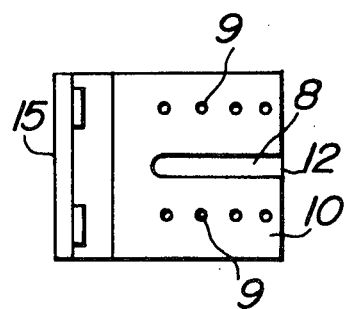

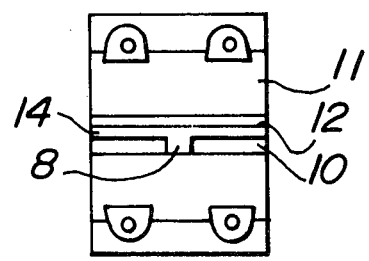
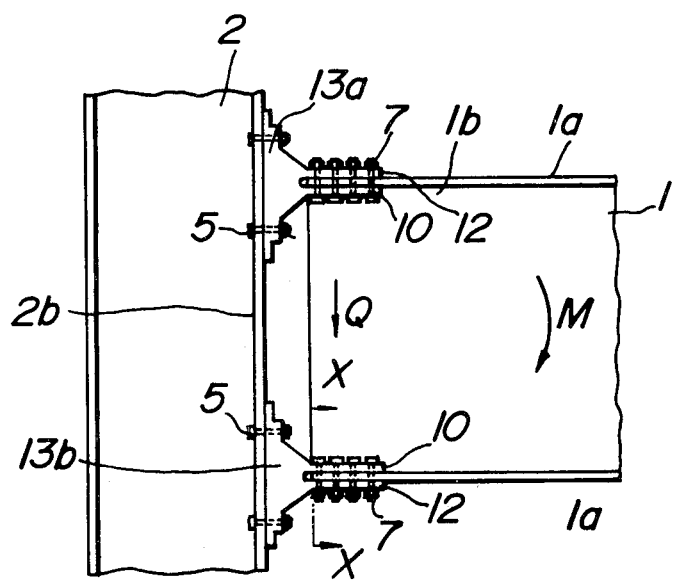

FITTINGS FOR CONNECTING COLUMNS AND BEAMS

BACKGROUND OF THE INVENTION

1. Field of the Invention

The present invention relates to fittings for connecting beams to columns of a steel frame construction and a reinforced concrete steel frame construction, particularly for connecting H-shaped steel beams to columns having open crosssections and a method of connecting beams to columns of a steel frame construction by means of the fittings.

It will be understood that the term "fitting" used herein means the metallic integral article according to the present invention while the term "fitting member" means also the same article but is used to indicate the difference in shape of the fitting such as "outer fitting member" or "inner fitting member".

2. Description of the Prior Art

Heretofore, to connect a beam to a column of a steel frame construction, it has been known to provide T-shaped members of which protrusions are connected to flanges of the beam by means of high strength bolts with one surface frictional engagement, and of which bottom plates are connected to a flange of the column by means of high strength bolts under tensile forces, a joint member connecting a web of the beam and the flange of the column, and horizontal stiffeners fixed to the column at the locations of the T-shaped members. However, since the thickness of the bottom plate of the T-shaped member is so uniform that when the flange of the beam is subjected to a tensile force, the bolts connecting the bottom plate to the flange of the column will be additionally subjected to forces resulting from a lever effect due to the shape of the T-shaped member, with the result that the joint efficiency of the connection will be lower. Furthermore, the flange of the beam and the T-shaped member are connected in one surface frictional engagement, so that a number of the bolts are required to obtain a frictional force desired as a joint, which may increase not only labor cost for working the members, columns and beams in a factory fabricating them but also labor cost for assembling them in building site.

In the prior art, moreover, the joint members are required to support shearing forces acting upon the beam. Such joint members may also increase not only the labor cost for working the members, columns and beams in the factory fabricating them but also the labor cost for assembling them in building site.

In case of a connection of a beam to a web of a column, it has been found that when the beam is subjected to a severe bending moment, the web of the column at the connection will be the weakest point and if flanges of the column without web stiffeners are subjected to a bending moment, the distance between the flanges of the column is often increased to a greater extent than in any other connection methods.

SUMMARY OF THE INVENTION

It is an object of the present invention to provide fittings for connecting columns and beams of steel frame construction and a method thereof, overcoming the disadvantages in the prior art, increasing frictional forces at frictional engagements to improve joint efficiency at the connection of the columns and beams and accomplishing a rationalization in assembly of steel frame construction.

It is another object of the present invention to provide a method of connecting columns and beams to form improved joints capable of preventing deformation of flanges of a column and smoothly transmitting to the column a load directing to a plane of a web of the column without using the web for the joint.

In order to accomplish the above objects the fittings according to the invention for connecting H-shaped beams and columns of a steel frame construction, each fitting comprising an L-shaped outer fitting member including a column side plate formed with holes for bolts for connecting it to the column and a beam side plate formed with holes for bolts for connecting it to an outside of a flange of the beam, said column side plate successively increasing its thickness from a free end to a portion connected to the beam side plate; and an L-shaped inner fitting member including a column side plate formed with holes for bolts for connecting it to the column and a beam side plate formed with holes for bolts for connecting it to an inside of said flange of the beam, said column side plate successively increasing its thickness from a free end to a portion connected to the beam side plate, thereby embracing said flange of said beam between said beam side plates of said outer and inner fitting members.

In another aspect the invention provides a method of connecting a column and a beam having an H-shaped section of a steel frame construction by means of fittings and bolts, each said fitting comprising an L-shaped outer fitting member including a column side plate and a beam side plate respectively formed with holes for said bolts and an L-shaped inner fitting member including a column side plate and a beam side plate respectively formed with holes for said bolts, characterized in comprising steps of connecting to said column at a determined level by means of bolts one of said outer fitting members which is intended to be connected to a lower flange of the beam; temporarily connecting one of said outer fitting members and two of said inner fitting members to an outside of an upper flange of said beam and insides of the upper and lower flanges of one end of said beam respectively such that these fitting members are inwardly positioned relative to a longitudinal direction of the beam by at least one pitch of the holes for the bolts; placing said beam and fittings thus assembled onto said outer fitting member first connected to said column; and tightening said bolts to connect all said fittings to said column and said flanges of said beam after removal of said bolts temporarily connecting said fittings to said beam, whereby said flanges of said beam are embraced between said outer and inner fitting members to form two surface frictional engagements and said column and said column side plates of said fitting members are firmly connected by means of said bolts under tension.

These and other objects, features and advantages of the invention will become more apparent upon a reading of the following detailed specification and drawing, in which:

BRIEF DESCRIPTION OF THE DRAWING

FIG. 1 is a side elevation of a joint of a column and a beam of a steel frame construction using T-shaped members in the prior art;

FIG. 2 is a front elevation of a joint of a column and a beam of a steel frame construction according to the present invention as viewed in a direction of a web of the column;

FIG. 3 is a side view of an outer fitting member according to the present invention to be used on the outsides of flanges of the beam;

FIG. 4 is a plan view of the fitting member shown in FIG. 3;

FIG. 5 is a side view of an inner fitting member according to the present invention to be used on the insides of flanges of the beam;

FIG. 6 is a bottom plan view of the fitting member shown in FIG. 5;

FIG. 7 is a joint of a column and a beam according to the present invention showing directions of a bending moment and a shearing force;

FIGS. 8a and 8b are front and side views of a beam of a uniform section having a moment of inertia of area equivalent to that of the fitting according to the invention;

FIG. 9 shows a model for analyzing the strength of the fitting according to the invention;

FIG. 10 is a diagrammatic illustration of the process for connecting a beam to a column using the fittings according to the present invention;

FIG. 11 is a side elevation of the joint of the column and the beam shown in FIG. 2;

FIG. 12 is a side view of an inner fitting member according to the present invention to be used on the insides of the flanges of the beam;

FIG. 13 is a bottom plan view of the fitting member shown in FIG. 12;

FIG. 14 is a side view of a fitting of an embodiment of the invention;

FIG. 15 is a bottom plan view of the fitting shown in FIG. 14;

FIG. 16 is a side view of the fitting shown in FIG. 14;

FIG. 17 is a front elevation of a joint of a column and a beam of a steel frame construction using the fittings shown in FIG. 14.

DESCRIPTION OF THE PREFERRED EMBODIMENTS

Figure 18:
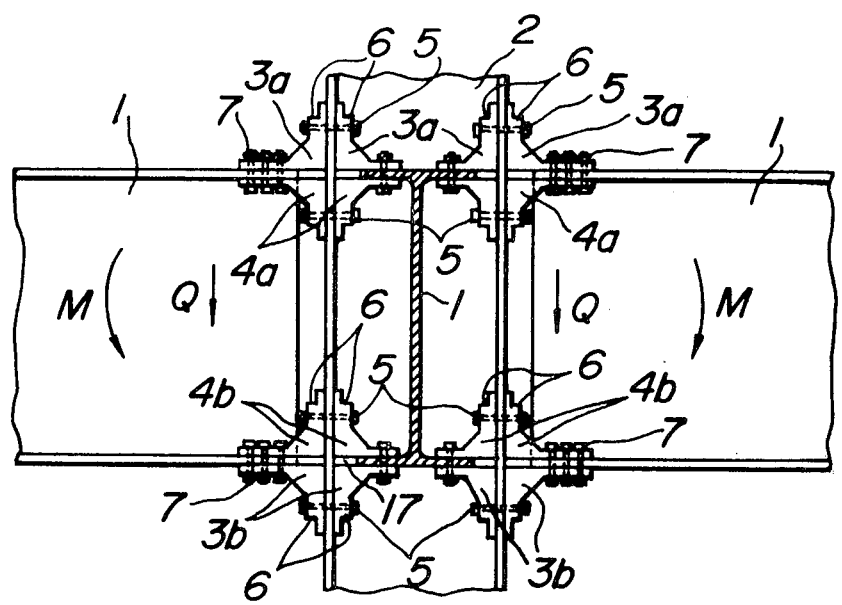
FIG. 18 is a front elevation of a joint of a column and beams of a steel frame construction according to the invention wherein the fittings are connected to insides of flanges of the column but not directly connected to a web of the column.

Referring first to FIG. 1 wherein there is shown a conventional connection of a beam 1 and a column 2 of a steel frame construction hitherto used, the connection utilizes T-shaped members 3 for connecting flanges 1a of the beam 1 to the column by means of high strength bolts 5, a joint member 16 for connecting a web 1b of the beam 1 to the column 2 by means of high strength bolts, and horizontal stiffeners 2a fixed to the column 2 at the locations of the T-shaped members. The T-shaped member 3 has a protrusion 3b of which one surface is in friction engagement with the flange 1a of the beam 1 and a bottom plate 4 is connected to the column 2 by means of high strength bolts 5 which may be subjected to tensile forces. In the prior art, however, since the thickness of the bottom plate 4 of the T-shaped member 3 is so uniform that the bolts 5 connecting the bottom plate to the flange of the column will be additionally subjected to forces resulting from a lever effect due to the shape of the T-shaped member when the flange of the beam is subjected to a tensile force, with the result that the joint efficiency of the connection will be lower.

Furthermore, the flange of the beam and the T-shaped member 3 are connected in one surface frictional engagement, so that for the purpose of obtaining a desired frictional force it is required a number of the bolts 5 which will increase not only labor cost for working the members, columns and beams in a factory fabricating these members but also labor cost for assembling them in building site.

Moreover, the joint members 16 are required to support shearing forces acting upon the beam 1. Such members will also increase not only the labor cost for working the members, columns and beams in a factory fabricating these members but also the labor cost for assembling them in building site.

In case of a connection of a beam to a web of a column, it has been found that when the beam is subjected to a severe bending moment, the web of the column at the connection will be the weakest point and if flanges of the column without web stiffeners are subjected to a bending moment, the distance between the flanges of the column is often increased to a greater extent than in any other connection methods.

Referring now to FIG. 2 which illustrates a joint of a steel frame construction using fittings according to the present invention, beams 1 are connected to a column 2 by means of the fittings 3a, 3b; 4a, 4b according to the present invention with the aid of high strength bolts 5 and 7. The fittings 3a and 3b or outer fitting members are fixed to the outsides of flanges of the beam by means of the bolts 7. The fittings 4a and 4b or inner fitting members are fixed to the insides of the flanges of the beam by means of the bolts 5. These fitting members are formed with abutments 6 for the bolts 5 and also the fitting members 4a and 4b are formed with slits 8 which make it possible to receive the web of the beam.

FIGS. 3 and 4 show the outer fitting member 3a or 3b for the outside of the flange of the beam. The L-shaped outer fitting member 3a or 3b consists of a beam side plate 22 formed with holes 22a for the bolts which are, for example, six as shown in FIG. 4 and a column side plate 24 formed with holes 24a for the bolts which are, for example, two as shown and an abutment 6 for the holes. The thickness of the column side plate 24 increases from its free end ($tH$) to the portion connected to the beam side plate 22 ($t_1$). FIGS. 5 and 6 show the inner fitting member 4a or 4b for the inside of the flange of the beam. The L-shaped inner fitting member 4a or 4b consists of a beam side plate 26 formed with holes 26a for the bolts which are, for example, six as shown and with the slit 8 for receiving the web of the beam and a column side plate 28 formed with holes 28a for the bolts which are, for example, two as shown and an abutment 6 for the holes. The thickness of the column side plate 28 increases from its free end to the portion connected to the beam side plate 22.

In general, one end of a beam will be subjected to a bending moment M and a shearing force Q simultaneously. If the bending moment and the shearing force act in the directions of the arrows M and Q as shown in FIG. 7, the upper and lower flanges of the beam will be subjected to tensile and compressive forces, respectively. The high strength bolts 5 for connecting the fittings 3a and 4a for the upper flange of the beam to the column 2 are subjected to a tensile force.

The fittings 3a, 4a and 3b, 4b are frictionally engaged with the flanges of the beam with the aid of the high strength bolts 7. The flange of the beam is embraced between two fittings 3a and 4a or 3b and 4b to provide a two surface friction engagement. Let frictional forces at one and two surfaces be $RS_1$ and $RS_2$, coefficients of friction $\mu_1$ and $\mu_2$, numbers of the bolts $n_1$ and $n_2$ and an initial tensile force in the bolt $B_0$.

$$RS_1 = n_1 \cdot B_0 \cdot \mu_1$$

$$RS_2 = n_2 \cdot B_0 \cdot \mu_2$$

However, since the connection force in the two surface engagement is twice that of the one surface engagement, the desired frictional force in the two surface engagement can be accomplished by the number of the bolts which is one half of the number in the one surface engagement. Accordingly, the length of the fittings can be shortened to approximately one half of that in the one surface engagement.

Assuming that when the fittings are subjected to a tensile force, they behave as elastic bodies at least until the connected surfaces are about to be separated. It has been found in our experiments that since the thickness $t_1$ at the bottom of a column side plate of the fitting $3a$ or $3b$ is fairly thicker than that $t_H$ of the free edge of the column side plate as shown in FIG. 3, in an analysis of the strength of the fittings the column side plate can be assumed as an equivalent cantilever or beam having a uniform rectangular sectional area as shown in FIG. 8a if a reaction force resulting from a lever effect is neglected. When the thickness and width of the plate are $t_e$ and $b$ as shown in FIG. 8b, a moment of inertia of area of the equivalent cantilever or beam as shown in FIG. 8 is $Ie = (1/12) \times b \times t_e^3$ which determines a deformation of the cantilever. FIG. 9 shows a section of an L-shaped fitting according to the invention. An average moment of inertia of area of the fitting $I_0$ is approximately $\frac{1}{2}(I_1 + I_2)$, where $I_1$ is a moment of inertia of area at the proximity of a hole for a bolt, that is, $(1/12) \times b \times t_1^3$, and $I_2$ is a moment of inertia at the height of $t_2$, that is, $1/12 \times b \times t_2^3$.

The $t_2$ is expressed as $t_2 = K \times t_1$ in a relation to the $t_1$. Therefore, $I_0 = (1/24) \times b \times (1 + K^3) \times t_1^3$. When $I_e$ is equal to $I_0$, the relation between $t_e$ and $t$ is indicated as follows.

$$t_e/t = \sqrt[3]{\tfrac{1}{2}(1 + K^3)}$$

Table 1 indicates various values of the L-shaped fittings according to the present invention and the equivalent cantilever or beam having a uniform section corresponding to the value of K from 1 to 5, where Ios and Ies are moment of inertia of area per a unit width of the fitting and the equivalent beam and $A_1$ and $A_0$ are areas of the shaded portions in FIGS. 8 and 9, respectively.

decreasing its thickness from its bottom end to the free end is of light weight but has the same moment of inertia of area as that of the equivalent beam having a uniform section, so that the light weight fitting according to the invention can exhibit a higher rigidity.

In assembling beams and columns by means of the fittings according to the invention in building sites, as shown in FIG. 10 to the flange of the column is connected by means of the bolts 5 the L-shaped outer fitting member 3b for supporting a lower flange of the beam 1 while to the beam 1 are temporarily connected the L-shaped fitting members 3a, 4a and 4b by means of the bolts 7 in a manner such that the fittings are located inwardly relative to the length of the beam by one pitch of holes for the bolts formed in the flanges of the beam. Accordingly, thus assembled beam and fittings are shorter than the distance between the two adjacent columns by two pitches of the holes for the bolts, so that the beam with fittings are inserted with ease between the columns. Then the beam is settled on the outer fitting member 3b fixed to the columns 2 and after removal of the bolts temporarily fixed to the fittings 3a, 4a and 4b the fitting members are shifted outwardly to determined positions relative to the beam 1 where they are clamped to the beam 1 and the columns 2. In this manner, filler plates can be dispensed with, which would otherwise be required as in the prior art such as the split-tee method.

It can be theoretically proved that when the beam and the column are sufficiently securely connected to each other by means of the high strength bolts 7, if the sectional area $Al$ of the L-shaped fitting along the line X—X is one and one half of the sectional area $Af$ of the lower flange of the beam, that is $Al = 1.5 \times Af$, the section $Al$ of the L-shaped fitting has a yield strength sufficient to transmit a shearing force and a bending moment and corresponding to an entire strength of the beam. Accordingly, the shearing force acting upon the beam can be transmitted to the column through the fittings for the flanges of the beam, so that stiffeners in the prior art for fitting the web of the beam with the flange of the column can be dispensed with, thereby decreasing labor cost for providing the stiffeners.

According to the invention, the fitting to be used in inside of the flanges of the beam is separated at its center into two parts as shown in FIGS. 10, 12 and 13 for receiving or accommodating the web of the beam 1 therebetween, permitting the overall length of the beam with the fittings to be adjusted in assembling the beams and the columns, which serves to improve an efficiency in assembling operation. The fittings to be used in the inside of the flanges of the beam are shown in FIGS. 12

Table 1

| | L-shaped fitting according to the invention | | | Equivalent beam having a uniform section | | | | |
|---|---|---|---|---|---|---|---|---|
| | $t_1$ mm | $A_1$ cm$^2$ | Ios cm$^3$ | $t_e$ mm | $A_0$ cm$^2$ | Ies | $A_0/A_1$ | Ies/Ios |
| K=1 | 10 | 10 | 0.08 | 10 | 10 | 0.08 | 1 | 1 |
| K=2 | 10 | 11.5 | 0.37 | 16.5 | 16.5 | 0.37 | 1.4 | 1 |
| K=3 | 10 | 13.0 | 1.16 | 24.1 | 24.1 | 1.16 | 1.85 | 1 |
| K=4 | 10 | 14.7 | 2.7 | 32.0 | 32.0 | 2.7 | 2.17 | 1 |
| K=5 | 10 | 16.4 | 5.6 | 39.8 | 39.8 | 5.6 | 2.43 | 1 |

As can be seen from the Table 1, if we assume $K = 4$, $a = 60$ mm, $c = 40$ mm, $d = 50$ mm, $tH = 6$ mm and $t_1 = 10$ mm in FIGS. 8 and 9, the value of $t_e$ is 32.0 mm which is of uniform thickness. In the case, $A_1$ is 14.7 cm$^2$ and $A_0$ is 32.0 cm$^2$, the ratio of $A_0/A_1$ is 2.17. Accordingly, it can conclude that the L-shaped fitting and 13. The inner fitting members shown in FIGS. 12 and 13 is substantially similar to that shown in FIGS. 3 and 4 with the exception that the width as viewed in FIG. 13 is less than or one half of that of the inner fitting member in FIG. 4 so that the holes 22a for the bolts are three. The assembled beam and column by means of the fittings are shown in FIGS. 2 and 11. Accordingly, in case of using the fitting members as shown in FIGS. 12 and 13, the assembling of the beam and column can be carried out in the same manner as in FIGS. 10 and 11, so that filler plates can be dispensed with which would be required in the prior split-tee method.

As can be seen from FIGS. 2 and 11, when a beam perpendicular to the surface of a web of a column is connected to the column, the overall length of the beam with the fittings is somewhat shortened by axially inwardly shifting in the longitudinal direction and clamping the fittings to the beam to facilitate a lateral insertion of the beam between the columns without any interference of brackets for diagonal bracing. Such an interference was a disadvantage in a method wherein a beam is vertically lowered between the columns. The flanges of the beam are embraced between the fittings 3a, 4a and 3b, 4b, so that a two surface frictional engagement can be accomplished, thereby reducing the length of the engaged surface and the number of the bolts to about one half of those in the one surface engagement to obtain a desired frictional force.

Even if the distance between the columns and the length of the beam are different from determined values in the order of two or three millimeters, such a difference can be accommodated by holes formed in the fittings which are elliptical having a major axis in parallel with the longitudinal direction of the beam. Although the elliptical force, it can be compensated by an increase of the length of the frictional engagement and the number of the bolts.

According to the present invention, the fittings as shown in FIGS. 14–16 are used to provide a connection of a beam to a column as shown in FIG. 17 which provides the effect as above described. As shown in FIGS. 14–16, the fitting 13a or 13b is a form of a combination of the outer fitting member 3a or 3b as shown in FIGS. 3 and 4 and the inner fitting member 4a or 4b as shown in FIGS. 5 and 6 in back to back relationship, so that the beam side plates 22 and 26 are integrally formed as a protrusion 10, 12 leaving a slot 14 for receiving the flange of the beam and the column side plates 24 and 28 are integrally formed as a bottom plate 15. As shown in FIGS. 14–16, the bottom plate 15 of the fitting decreases its thickness from a bottom 11 of the protrusion 10 and 12 toward the outer ends of the bottom plate 15 and the protrusion 10, 12 is formed with holes 9 for the bolts and a slit 8 forming with the slot 14 a T-shaped clearance for receiving the parts of the web 1b and the flange 1a of an H-shaped beam 1. When the beam 1 and the colum n 2 are connected by means of the fittings 13a and 13b as shown in FIG. 17, the end of the beam 1 is subjected to a bending moment M and a shearing force Q, so that a tensile force will be applied to the upper flange 1a of the beam 1 and a compressive force will be applied to the lower flange 1a'. Accordingly, the fitting 13a for the upper flange and the high strength bolts for connecting the fitting 13a to the column are subjected to tensile forces. The upper flange 1a of the beam 1 and the fitting 13a therefor are frictionally engaged with each other with the aid of the high strength bolts 7. Accordingly, the flange 1a of the beam 1 is embraced between the two protrusions 10 and 12 of the fitting 13a, so that a two surface frictional engagement can be accomplished thereby reducing the number of the bolts, the length of the protrusions 10 and 12 to one half of these in one surface engagement and further considerably reducing the weight of the fittings.

It can be theoretically proven that when the beam 1 and the fittings 13b are sufficiently securely connected to each other by means of the high strength bolts 7, if the sectional area $Al$ of the bottom 11 of the protrusion of the fitting 13b along the line X—X is one and one half of the sectional area $Aj$ of the lower flange of the beam, that is $1.5 \times Aj = Al$, the section $Al$ of the fitting has a yield strength sufficient to transmit a shearing force and a bending moment and corresponding to an entire strength of the beam. Accordingly, the shearing force acting upon the beam can be transmitted to the column through the fitting 13b, so that joint member 16 in the prior art for connecting the web 1b of the beam 1 to the flange 2b of the column 2 can be dispensed with to decrease labor cost for providing the joint member 16.

In manufacturing, the fittings according to the present invention can very easily be produced in high uniformity by casting. The fittings may be made of a conventional alloy in casting. Preferably, the alloy is cast alloy, such as SCW 49 of Japanese Industrial Standard (JIS) G5102. In the prior art, T-shaped members having high stem portions used for the split-Tee method have been made by rolling in a particular mill as three roll system or in a large type mill in disregard of a producibility. In contrast, the fittings according to the present invention can be made with ease by rolling in a mill for shaped steel. In this case, with a careful consideration to calibers formed in rolls it is possible to prevent a decrease in yield strength which would result from lamination produced in rolling. The fittings may be made of a conventional rolled steel. Preferably, the steel is SM50C of Japanese Industrial Standard (JIS) G3106. The fittings according to the invention may be easily made by forging, particularly die forging, or extruding, using forged steel as a material of the fittings.

FIG. 18 shows other embodiment of the invention in which the fittings 3a, 3b, 4a and 4b according to the invention are secured to ends of flanges of a beam 1 as shown in shaded section at the center of FIG. 18 by means of bolts and then connected to insides of flanges of a column 2 by means of bolts but not directly connected to a web of the column, thereby preventing any deformation of the flanges of the column 2 caused by a tensile or compressive force transmitted from the beams perpendicular to the surfaces of the flanges of the column. The connection in the embodiment in FIG. 18 may utilize the fittings as shown in FIGS. 3 and 4, whereas modified fittings may be used which are elongated in their width as viewed in FIG. 4 to supplement a limitation of the height of the fittings. The high strength bolts for connecting the fittings to the insides of the flanges of the column are commonly used for connecting the fittings to the outsides of the flanges of the column. The reference numeral 17 in FIG. 18 indicates the surface of the fitting in contact with the flange of the beam. The number of the holes for the bolts provided in the surface 17 will be determined by the bending moment acting upon the beam connected to the web of the column. The bending moment acting upon the beam perpendicular to the surface of the web of the column is transmitted to the column through the fittings and the flanges of the column but not through the web of the column. Since the transmission is effected in this manner through the flanges of the column which have a modulus of section or moment of inertia of area larger than that of the web of the column, the connection now explained herein is stronger than a connection wherein a bending moment is transmitted to a column through a web thereof.

When the beam 1 as shown in the left hand or right hand in FIG. 18 connected to the flanges of the column is subjected to a bending moment M and a shearing force Q as shown, a tensile force is applied to the upper flange of the beam so that the flange of the column connected through the fittings to the upper flange of the beam is outwardly deformed, and a compressive force is applied to the lower flange of the beam so that the flange of the column is inwardly deformed. According to the present invention, however, the fittings and the beam as shown in the center of FIG. 18 perpendicular to the surface of the web of the column serve to prevent such deformations of the flanges of the column as if they were stiffeners. In general, a stiffener consisting of a steel plate welded to a location where it is required is likely to give rise to a stress concentration in the proximity of the welded portion. In contrast therewith, the fittings in the joint of the construction according to the present invention distribute stresses to avoid any stress concentration, as a result of which a smooth stress transmission can be accomplished.

As a modification of the fitting as shown in FIGS. 14 and 15, a fitting (not shown) is not formed with a slot 8 but formed with a slot 14 for receiving the end of the flange of the beam 1 perpendicular to the surface of the web of the column. By the use of such modified fittings the beam perpendicular to the surface of the web of the column can be connected to the column as shown in FIG. 18 with the same advantage above described.

The effects of the fittings and the method of connecting beams and columns by means of the fittings according to the present invention distinguishable over those of the prior art are as follows.

1. No welding operation is any longer required to form a joint of a steel frame construction, so that all that is required in a factory for working beams and columns are cutting and drilling of the beams and drilling of the columns to considerably reduce labor cost.

2. The beams and columns to be connected with the fittings according to the invention do not have any protrusions thereon so that they are easily transported from a factory for working them to a building site.

3. In assembling at a building site, beams can be applied in a horizontal direction into between columns without vertically lowering the beams from a higher location into between the columns, so that the assembly of the beams and columns are simplified and filler plates are not required which would be needed when the beams are lowered vertically. Errors in the order of two or three millimeters between the members are accommodated by forming the holes for the bolts in an elliptical form which serves to improve the efficiency in assembling the members.

4. The beam and the fitting according to the invention are connected by means of the bolts with the two surface frictional engagement which makes it possible to reduce the frictional contact portions to one half of those in a one surface frictional engagement, so that the weight of the members is reduced and the labor cost for assembling at a building site is reduced to one half of that in the prior art.

5. Since the efficiency of the joint using the fittings according to the invention is higher than in the prior art, a less number of the high strength bolts is sufficient for the same purpose and joints of beams and columns subjected to tensile forces can be used in wider applications.

It is further understood by those skilled in the art that the foregoing description is preferred embodiments of the invention and that various changes and modifications may be made in the invention without departing from the spirit and scope thereof.

What is claimed is:

1. Fittings for connecting H-shaped beams and columns of a steel frame construction, each fitting comprising an L-shaped outer fitting member including a column side plate formed with holes for bolts for connecting it to the column and a beam side plate formed with holes for bolts for connecting it to an outside of a flange of the beam, said column side plate successively increasing its thickness from a free end to a portion connected to the beam side plate; and an L-shaped inner fitting member including a column side plate formed with holes for bolts for connecting it to the column and a beam side plate formed with holes for bolts for connecting it to an inside of said flange of the beam, said column side plate successively increasing its thickness from a free end to a portion connected to the beam side plate, thereby embracing said flange of said beam between said beam side plates of said outer and inner fitting members.

2. Fittings as set forth in claim 1, wherein said beam side plate of said L-shaped inner fitting member is formed with a slit for receiving a web of said beam.

3. Fittings as set forth in claim 1, wherein said L-shaped inner fitting member is divided into two inner half fitting members to receive a web of said beam therebetween.

4. Fittings as set forth in claim 1, wherein said outer and inner fitting members are formed integrally with each other in back to back relationship of said side beam side plates of said outer and inner fitting members so as to form a common column side plate and a common beam side plate, wherein said common beam side plate is formed with a flange slit for receiving said flange of said beam and is further formed with a web slit forming with said flange slit a T-shaped slit for receiving said flange and a part of said web of said beam.

5. Fittings for connecting H-shaped beams and columns of a steel frame construction, each fitting comprising an L-shaped outer fitting member including a column side plate formed with holes for bolts for connecting it to the column and a beam side plate formed with holes for bolts for connecting it to an outside of a flange of the beam, said column side plate successively increasing its thickness from a free end to a portion connected to the beam side plate; and an L-shaped inner fitting member including a column side plate formed with holes for bolts for connecting it to the column and a beam side plate formed with holes for bolts for connecting it to an inside of said flange of the beam, said column side plate successively increasing its thickness from a free end to a portion connected to the beam side plate, such that said fitting members are located inwardly relative to the length of said beams thereby embracing said flange of said beam between said beam side plates of said outer and inner fitting members.

6. Fittings as set forth in claim 5, wherein said beam side plate of said L-shaped inner fitting member is formed with a slit for receiving a web of said beam.

7. Fittings as set forth in claim 5, wherein said L-shaped inner fitting member is divided into two inner half fitting members to receive a web of said beam therebetween.

8. Fittings as set forth in claim 5, wherein said outer and inner fitting members are formed integrally with each other in back to back relationship of said side beam side plates of said outer and inner fitting members so as to form a common column side plate and a common beam side plate, wherein said common beam side plate is formed with a flange slit for receiving said flange of said beam and is further formed with a web slit forming with said flange slit a T-shaped slit for receiving said flange and a part of said web of said beam.

9. Fittings for connecting H-shaped beams and columns of a steel frame construction, each fitting comprising an L-shaped outer fitting member including a column side plate formed with holes for bolts for connecting it to the column and a beam side plate formed with holes for bolts for connecting it to an outside of a flange of the beam, said column side plate successively increasing its thickness from a free end to a portion connected to the beam side plate; and an L-shaped inner fitting member including a column side plate formed with holes for bolts for connecting it to the column and a beam side plate formed with holes for bolts for connecting it to an inside of said flange of the beam, said column side plate successively increasing its thickness from a free end to a portion connected to the beam side plate, such that said fitting members are located inwardly relative to the length of said beams thereby embracing said flange of said beam between said beam side plates of said outer and inner fitting members, wherein said beam side plate of said L-shaped inner fitting member is formed with a slit for receiving a web of said beam, said L-shaped inner fitting member is being divided into two inner half fitting members to receive a web of said beam therebetween such that said fitting members are located inwardly relative to the length of said beams by one pitch of said holes formed in said flange of said beam.

* * * * *